(12) United States Patent
Dantin et al.

(10) Patent No.: US 9,193,627 B2
(45) Date of Patent: Nov. 24, 2015

(54) USE OF AT LEAST ONE SUPERABSORBENT POLYMER (SAP), IN A DRY COMPOSITION BASED ON MINERAL BINDER AND INTENDED FOR THE PREPARATION OF A HARDENABLE WET FORMULATION FOR THE CONSTRUCTION INDUSTRY

(75) Inventors: Véronique Dantin, Saint-Quentin Fallavier (FR); Paulo Goncalo, Saint-Quentin Fallavier (FR); Stephanie Persoz, Saint-Quentin Fallavier (FR)

(73) Assignee: PAREXGROUP SA, Issy les Moulineaux (FR)

( * ) Notice: Subject to any disclaimer, the term of this patent is extended or adjusted under 35 U.S.C. 154(b) by 0 days.

(21) Appl. No.: 13/513,506

(22) PCT Filed: Mar. 9, 2012

(86) PCT No.: PCT/EP2012/254168
§ 371 (c)(1),
(2), (4) Date: Jul. 20, 2012

(87) PCT Pub. No.: WO2013/131584
PCT Pub. Date: Sep. 12, 2013

(65) Prior Publication Data
US 2014/0371352 A1    Dec. 18, 2014

(51) Int. Cl.
*C04B 24/26*    (2006.01)
*B01F 3/12*     (2006.01)
*C04B 28/02*    (2006.01)
*C04B 103/00*   (2006.01)

(52) U.S. Cl.
CPC ......... *C04B 24/2652* (2013.01); *B01F 3/1214* (2013.01); *B01F 3/1228* (2013.01); *C04B 28/02* (2013.01); *B01F 2215/006* (2013.01); *B01F 2215/0047* (2013.01); *B01F 2215/0049* (2013.01); *C04B 2103/0051* (2013.01); *C04B 2201/32* (2013.01)

(58) Field of Classification Search
USPC .......................................................... 524/5
See application file for complete search history.

(56) References Cited

U.S. PATENT DOCUMENTS

| | | | |
|---|---|---|---|
| 7,288,147 B2 | 10/2007 | Christensen et al. | |
| 8,469,095 B2 * | 6/2013 | Le Roy-Delage et al. | 166/293 |
| 2003/0144386 A1 * | 7/2003 | Pakusch et al. | 524/5 |
| 2010/0190888 A1 * | 7/2010 | Gaeberlein et al. | 524/5 |

FOREIGN PATENT DOCUMENTS

| | | | | |
|---|---|---|---|---|
| FR | 2955103 | 7/2011 | | |
| FR | 2955104 | 7/2011 | | |
| WO | WO 2004101952 A1 * | 11/2004 | | E21B 33/13 |

* cited by examiner

*Primary Examiner* — Vu A Nguyen
(74) *Attorney, Agent, or Firm* — Vedder Price P.C.; Thomas J. Kowalski; Deborah L. Lu (57) ABSTRACT

The invention relates to the use of a mixture comprising a mineral binder (a) and at least one SuperAbsorbent Polymer (SAP) (b),
in order to improve the thermal insulation characteristics of a hardened product intended for the construction industry, by reducing its thermal conductivity λ (W·m−1·K−1), this hardened product being obtained from a dry composition or a wet formulation comprising this mixture.
The dry composition, the wet formulation obtained by mixing this dry composition with water, the methods for preparing this dry composition and the corresponding wet formulation, the hardened construction products obtained from the wet formulation and the structures produced with these products, are other subjects of the invention.

14 Claims, 1 Drawing Sheet

FIG. 2

USE OF AT LEAST ONE SUPERABSORBENT POLYMER (SAP), IN A DRY COMPOSITION BASED ON MINERAL BINDER AND INTENDED FOR THE PREPARATION OF A HARDENABLE WET FORMULATION FOR THE CONSTRUCTION INDUSTRY

CROSS REFERENCE TO RELATED APPLICATIONS

This application is a §371 National Stage Application of PCT/EP2012/054168, filed Mar. 9, 2012.

BACKGROUND OF THE INVENTION

1. Field of the Invention

The technical field of the invention is that of powder compositions intended for the preparation of wet formulations for the construction industry, for example renders, mortars, concretes or adhesives for construction.

These wet formulations can be obtained:
directly by mixing the powder compositions on site (e.g. renders, mortars, concretes or adhesives for construction),
by mixing the powder compositions on industrial sites to produce prefabricated parts such as for example plates, concrete blocks or monomer blocks.

More precisely, the invention relates to the use of a Super-Absorbent Polymer (SAP) in dry compositions based on mineral binders, these compositions being capable, after mixing with water at high mixing ratios, for example greater than 50%, of producing wet formulations that make it possible to produce lightweight hardened articles, such as exterior or interior coverings or renders (e.g. exterior thermal insulation system (ETI)/decoration/protection/waterproofing), adhesives, solid objects, etc.

2. Description of Related Art

In this technical field, there is a constant need for a "foam" system that incorporates air into the wet or hardened renders, mortars and concretes, so as to make them lighter and give them beneficial properties in particular as regards sound and/or thermal insulation and thermal resistance or fire resistance. These low-density wet render, mortar or concrete foams must also have good workability or handling. The sound and/or thermal insulation properties of these render, mortar or concrete foams would be particularly acceptable for floor coverings or resurfacing, exterior renders for protecting facades and firestop mortars, among others.

A certain number of admixtures for render, mortar or concrete compositions are already known, the function of which is to generate gases in situ and therefore to form a foam after mixing and porosity after hardening. This is the case in particular for aluminium powders capable of producing hydrogen in an aqueous or alkaline medium, as well as for hydrogen peroxide, which quickly releases oxygen when it comes into contact with catalysts such as silver or potassium permanganate. Other families of admixtures that generate gas in situ in a cementitious medium, such as oxygen, nitrogen, hydrogen, carbon dioxide, carbon monoxide, ammonia and methane, are described in U.S. Pat. No. 7,288,147B by the company Construction Research & Technology.

Thus the lightweight blocks of the YTONG® type and the lightweight walls marketed by the company XELLA® are obtained by autoclaving blocks of calcium silicate that have previously been made lighter by introducing aluminium powder, which generates hydrogen. These prefabricated elements have properties of thermal insulation and mechanical strength allowing their use as structural elements (in the case of Thermopierre blocks, which have a lambda value close to 0.12 W/m·K and mechanical strength of 3-5 MPa approximately) or as non-bearing cladding elements, contributing additional thermal insulation (in the case of Multipor® cladding, which has a lambda value close to 0.048 W/m·K and mechanical strength of 0.5 MPa). Obtaining these elements requires aluminium powder to be handled, which requires particular precautions in view of its explosive nature. Moreover, a costly autoclaving stage is necessary to confer the necessary mechanical strength on these elements. This technique therefore cannot be used on site. Moreover, with respect to the production of prefabricated parts, there is a demand for alternative technologies for the production of prefabricated elements having the same types of mechanical and thermal insulation performance, which avoid the use of aluminium powder (eliminating the potential problems of explosion) and which avoid the costly autoclaving stage: energy cost, low productivity and specific investments.

Air-entraining admixtures are also known for renders, mortars and concrete, the purpose of which is to trap the surrounding air, during blending with water (mixing) of the dry compositions of renders, mortars or concrete. These air-entraining agents are for example surfactants, fatty acids and alkali salts of fatty acids such as sodium lauryl sulphate. Such known air-entraining admixtures are capable of improvement.

In fact, all of the difficulty of this route of production of foams by air-entrainment lies in the stabilization of the air trapped within the wet matrix of render, mortar or concrete. This stabilization is even more problematical in that it must not be obtained to the detriment of the standard properties (e.g. ease of use) of the wet forms of render, mortar or concrete foams, or to the detriment of the properties (in particular mechanical) expected for the hardened forms of these foams. Moreover, the stability of the foam must also be present at each stage of the preparation and application processes. This must be embodied by a density that does not vary during each stage, whether in the mixing vat, after passing through the pipes (lance output density l.o.d.) or during spraying, when the application is carried out in this way. Conversely, this density can be different between each stage. The reproducibility and reliability of the method of producing these foams, although problematical in an industrial environment, represent a real problem of robustness when use directly on site by unqualified operators is envisaged. In practice, their use on site is very limited as it requires highly qualified labour.

In order to improve this route of production of air-entraining foams, FR 2955103A proposes a dry composition for the preparation of render, mortar or concrete foams for the construction industry, which become porous once hardened, so that they are lightweight, thermally and/or sound insulating, both in paste form and hardened form, and which are obtained by air-entrainment during mixing. This composition includes a foaming admixture comprising:
A. a modified starch ether having a Brookfield viscosity comprised between 500 and 25,000 mPa·s.;
B. a stabilizer comprising at least one linear polyacrylamide;
C. a film-forming polymer.

FR2955104A relates to a thermally-insulating material with a cellular structure comprising by weight relative to the total weight of the material: −4 to 96% of a hydraulic binder characterized, before coming into contact with water, in that it comprises at least one phase chosen from C3A, CA, C12A7, C11A7CaF2, C4A3$ (ye'elimite), $C2A_{(1-x)}F_x$ (with C→CaO; A→Al$_2$O$_3$; F→Fe$_2$O$_3$ and x belonging to ]0, 1]), amorphous hydraulic phases having a molar ratio C/A comprised between 0.3 and 15 and such that the cumulative $Al_2O_3$ content of these phases is comprised between 3 and 70% by weight of the total hydraulic binder, −4 to 96% of at least one filler; said material having a coefficient of thermal conductivity at 20° C. that is equal to or less than 0.20 W/m·° C. This thermally-insulating material is obtained from a foam.

These aqueous foams according to FR2955103A & FR2955104A can be improved, as, on the one hand, their stability is not infallible, and, on the other hand, their blending with a cement slurry is an incorporation operation that must be carried out carefully in order to avoid breaking down these foams. Such an operation is difficult to carry out under on-site conditions and requires the use of specific machines.

It is also important that the gain in terms of being lightweight is not achieved to the detriment of the other properties required for structures obtained from the wet formulations of renders, mortars and concretes, produced from dry cementitious compositions. This relates to the properties of the wet formulation: ease of use, workability, pumpability, rheology, ease of blending and application, as well as cleaning the tools, and the properties of the hardened products obtained from this wet formulation: protection/waterproofing, thermal and sound insulation, hardness, crack resistance, flexural strength, compressive strength, and durability.

Patent application US2003/144386 describes mixtures of hydraulically setting building materials, comprising less than 2% by weight of particles of a size greater than 200 μm of a polymer capable of forming a hydrogel. In particular, US 2003/144386 discloses standard mortars prepared according to standard EN 196 (1,350 g of standardized sand-450 g of cement-225 g of water for mixing), in which are incorporated 0.5% by weight of the SuperAbsorbent Polymers (SAP) Hysorb C3746-1 & C Hysorb 3746-5 from BASF having less than 2% by weight of particles of a size greater than 200 μm as well as a comparative SAP Hysorb C 7015 from BASF having substantially more than 2% by weight of particles of a size greater than 200 μm. The SAPs Hysorb C3746-1 & C Hysorb 3746-5 make it possible to increase the compressive and flexural strength of the hardened finished products obtained from these mortars, compared with the comparative SAP Hysorb C 7015.

Patent application US2010/190888 describes a dry mixture of hydraulically setting building materials, preferably a tile adhesive in accordance with standard EN 12004, characterized in that it comprises:
a) 10 to 95 percent by weight of a cement-containing hydraulic binder,
b) 5 to 75 percent by weight of mineral fillers and/or organic fillers,
c) 0.5 to 10 percent by weight of a re-dispersible polymer powder,
d) 0.1 to 1.5 percent by weight of a water-retaining agent that is based on polysaccharide structures and is preferably water-soluble and is preferably chosen from the group constituted by cellulose ethers, starch ethers and synthetic or natural microbial polysaccharides,
e) 0.3 to 4.0 percent by weight of a setting accelerator, preferably hydrosoluble, chosen from the group constituted by calcium formate, calcium chloride, calcium nitrate and
$f_a$) or $f_b$) 0.02 to 2.0 percent by weight of an acrylic copolymer of the pulverulent anionic or cationic type, which is preferably capable of swelling by means of water or salt solutions and is particularly preferably insoluble in water and can advantageously be prepared by radical polymerization of unsaturated ethylene vinyl compounds; $f_a$) or $f_b$) having a particle size distribution that is determined in accordance with standard 420 EDANA.2-02, such that more than 98% by weight pass through a sieve having a mesh size of 200 μm. The compositions disclosed are:

| Tile adhesive | Tile adhesive | Composite thermal insulation system |
|---|---|---|
| a) CEM II A 42.5 R | a) Portland cement CEM I | a) Portland cement (for example CEM I 42.5 R) |
| b) Lightweight silica filler | b) Silica sand and calcareous aggregates | b) Silica sand or comminuted limestone |
| c) Vinyl acetate ethylene copolymer | c) Vinyl acetate ethylene copolymer | c) Vinyl acetate ethylene copolymer |
| d) Hydroxypropyl methylcellulose | d) Hydroxypropyl methylcellulose and starch ether | d) Hydroxypropyl methylcellulose |
| e) Calcium formate | e) Calcium formate accelerator | e) Calcium formate |
| $f_a$) Copolymer 1 (anionic): 0.30 or 0.45% | fa) Copolymer 1 (anionic) or fb) copolymer 2 (cationic): 0.30 or 0.45% | $f_a$) Copolymer 1 (anionic) or $f_b$) copolymer 2 (cationic): 0.30 or 0.4% |
| Cellulose fibres Na bentonite FeSO4—7H2O | Cellulose fibres | |
| Mixing ratio: 76, 56, 58 & 61% | Mixing ratio: 36% | Mixing ratio: 25% |

The compositions according to application US2010/190888 aim to improve the yield, namely the ratio between the volume of the wet formulation and the mass of the dry mortar, for economic reasons (e.g. reducing the stocks of dry mortar). The increase in the setting rate and the stability of the dry mortar. The use of calcium formate or other calcium salts contributes to this result according to application US2010/190888.

It therefore appears that the prior art does not teach any means for improving the thermal insulation characteristics of the hardened products for the construction industry obtained from wet formulations produced by the mixing of dry compositions based on mineral binder and a SuperAbsorbent Polymer (SAP).

SUMMARY

In this context, the technical problem at the heart of the present invention is satisfying at least one of the objectives listed hereinafter:
(i) Providing means for improving the thermal insulation characteristics of the hardened products for the construction industry obtained from wet formulations produced by the mixing of dry (e.g. cementitious) compositions based on mineral binder.

(ii) Providing means for reducing the reduced thermal conductivity $\lambda$ (W·m$^{-1}$·K$^{-1}$) of the hardened products for the construction industry, obtained from wet formulations produced by the mixing of dry (e.g. cementitious) compositions based on mineral binder.

(iii) Providing means satisfying objective (i) or (ii) above, by making the hardened products concerned significantly lighter, still with improved volume of wet formulation (paste)/volume or mass of dry composition yields, in particular compared with the conventional reference compositions such as those according to the application US2010/190888.

(iv) Providing means satisfying at least one of the objectives (i) to (iii) above, by making the hardened products concerned significantly lighter and by reducing the ecological footprint of the composition: reducing the $CO_2$ emissions during transport.

(v) Providing means satisfying at least one of the objectives (i) to (iv) above, by making the hardened products concerned significantly lighter, and by making the work less heavy for the user by making lighter bags available for an identical worked surface.

(vi) Providing means satisfying at least one of the objectives (i) to (v) above and allowing the use of a dry (e.g. cementitious) composition that results, after mixing, in wet formulations (renders-mortars-concretes-adhesives) rich in mixing liquid (e.g. water), and comprising at least one and a half times the quantity of water contained in a conventional mortar without superabsorbent.

(vii) Providing means satisfying at least one of the objectives (i) to (vi) above, with wet formulations (pastes-renders-mortars-concretes-adhesives) that can be easily sprayed, are simple to use, have a consistency and a viscosity of the paste allowing pumping by a cement gun, a suitability for pumping, a workability that is sufficiently long to carry out the mixing and the application in particular of renders, while remaining economical, and stable after mixing.

(viii) Providing means satisfying at least one of the objectives (i) to (vii) above, for hardened products that are protective/waterproof coverings, even optionally decorative coverings.

(ix) Providing means satisfying at least one of the objectives (i) to (viii) above, with wet formulations that are sufficiently stable to be capable of being applied or shaped and have durable mechanical properties in the hardened form.

(x) Providing means satisfying at least one of the objectives (i) to (ix) above, with methods for preparing the cementitious composition and the corresponding wet formulation that are easy to carry out and are economical.

(xi) Providing means satisfying at least one of the objectives (i) to (x) above, for lightweight hardened products (renders-mortars-cement-adhesive compositions) having a reduced thermal conductivity, simple to obtain, economical and endowed with good long-term mechanical performance (hardness, flexural/compressive strength, durability, cohesion) and having good performance in use.

(xii) Providing means satisfying at least one of the objectives (i) to (xi) above, for lightweight hardened products that are prefabricated parts allowing a costly autoclaving stage to be avoided.

(xiii) Providing means satisfying at least one of the objectives (i) to (xii) above, for methods for preparing the cementitious composition and the corresponding wet formulation that are easy to carry out and are economical.

(xiv) Providing means satisfying at least one of the objectives (i) to (xiii) above, for lightweight hardened products (prefabricated or not) for the construction industry obtained by means of the wet formulation mentioned in the above-mentioned objectives (pastes-grouts-renders-mortars-concretes, mortar-adhesive compositions, concrete blocks, sandwich panels), simple to obtain (without dangerous aluminium powders), economical (without autoclaving), endowed with good long-term mechanical performance (hardness, flexural/compressive strength, durability, cohesion) and having good performance in use.

The above-mentioned problem is solved by the invention, which proposes to this end the use of a mixture comprising a mineral binder (a) and at least one SuperAbsorbent Polymer (SAP) (b),
in order to improve the thermal characteristics (for example the insulation) of a hardened product intended for the construction industry, by reducing its thermal conductivity $\lambda$ (W·m$^{-1}$·K$^{-1}$), this hardened product being obtained from a dry composition or a wet formulation comprising this mixture.

The use according to the invention makes it possible to obtain hardened products for the construction industry having an excellent compromise between reducing the thermal conductivity/mechanical properties.

According to a preferred characteristic of the invention, the thermal conductivity $\lambda$ (W·m$^{-1}$·K$^{-1}$) of the hardened product is less than 1.0, preferably less than or equal to 0.95 and preferably less than or equal to 0.90.

With regard to $\lambda$, the greater reduction in thermal conductivity $\lambda$ (W·m$^{-1}$·K$^{-1}$) of the hardened product, compared with a hardened product without SAP (b), is, remarkably, greater than or equal to 10%, preferably 15% and more preferably 20%.

According to another aspect, the invention relates to a hardened construction product (prefabricated or not) obtained from the dry compositions or the wet formulations involved in the use according to the invention, the thermal conductivity $\lambda$ (W·m$^{-1}$·K$^{-1}$) of which is less than 1.0, preferably less than or equal to 0.95 and preferably less than or equal to 0.90.

According to another aspect, the invention relates to a hardened construction product (prefabricated or not) obtained from the dry compositions or the wet formulations involved in the use according to the invention and the greater reduction in thermal conductivity $\lambda$ (W·m$^{-1}$·K$^{-1}$) of which, compared with a hardened product without SAP (b), is greater than or equal to 10%, preferably 15% and more preferably 20%.

DETAILED DESCRIPTION OF A PREFERRED EMBODIMENT

It must also be noted that the use according to the invention involves dry compositions based on mineral binder (a) and SAP (b), which make available wet formulations that are easy to prepare, easy to use, with suitable rheology and workability and, in fine, coverings or hardened solid objects having mechanical properties that are fully satisfactory and stable over time. The requirements are also met in respect of the specifications for decoration, protection and waterproofing. Moreover, the composition according to the invention can result in hardened coverings having good fire resistance.

According to another aspect, the invention also relates to a wet formulation for the construction industry as defined in the use according to the invention, this formulation comprising the composition involved in the use according to the invention and a liquid, e.g. water, preferably at a mixing ratio greater than or equal to 20% by weight.

In particular, this wet formulation (render, mortar, concrete, adhesive) is endowed with good performance in use such as the "workability" and rheological properties suitable for pumping. Moreover, this formulation has in particular good mechanical strength.

According to another aspect, the invention relates to a method for preparing the wet formulation involved in the use according to the invention, characterized in that it essentially consists of blending a liquid, preferably water, with all or some of the components of the composition involved in the use according to the invention, the remainder of the components then being incorporated gradually into the mixture if this has not been done beforehand.

DEFINITIONS

In the whole of the present disclosure, any singular denotes either a singular or a plural.

The definitions given hereinafter by way of example can be used for the interpretation of the present disclosure:
"polymer" denotes either "homopolymer" or "copolymer";
"mortar" denotes a dry or wet or hardened mixture of one or more organic and/or mineral binders, containing aggregate with a diameter <5 mm (sands—aggregates), and optionally fillers and/or additives and/or admixtures;
"render" denotes more particularly a mortar used as a superficial covering for a surface in order to protect, homogenize, decorate it, etc.;
"adhesive" denotes a dry, wet or hardened composition, used to bond tiles onto a support;
"paste" denotes a wet composition containing water;
"filler" is a filler the bulk density of which is greater than 0.75;
"lightweight filler" is a filler the bulk density of which is less than or equal to 0.75;
"liquid": dispersion, emulsion or solution with an aqueous base.

Use of a SAP in a Dry Composition for the Construction Industry

It is to the inventors' credit that they demonstrate that incorporating a mineral binder (a)/SAP (b) mixture into a dry (e.g. cementitious) composition makes it possible, after hydration (e.g. mixing with water), to obtain hardened products for the construction industry that have a reduced thermal conductivity $\lambda$, are lightweight, mechanically strong, compact and have high volume of wet formulation (paste)/volume or mass of dry composition yield.

Dry Compositions Involved in the Use According to the Invention and Formulated for Different Hardened Products for the Construction Industry Mineral Binder (a)

Advantageously, the mineral binder (a) is chosen from the group comprising:
(i) mineral binders that do not contain any source(s) of aluminium ions, preferably from Portland cements and/or slag cements, geopolymer cements, natural pozzolanas, fly ash, supersulphated cements, calcium sulphates (gypsum, hemihydrate and/or anhydrite), lime (unslaked, slaked and/or hydraulic), and/or potassium, sodium, and/or lithium silicates;
(ii) mineral binders that contain one or more sources of aluminium ions:
preferably from the calcium aluminate cements (CAC) and/or calcium sulphoaluminate (CSA) cements and/or binders having a high content of alumina-rich cementitious phases;
and even more preferably from hydraulic binders comprising:
at least one phase chosen from $C_3A$, $CA$, $C_{12}A_7$, $C_{11}A_7CaF_2$, $C_4A_3\$$ (ye'elimite), $C_2A_{(1-x)}F_x$ (with $C \to CaO$; $A \to Al_2O_3$; $F \to Fe2O3$ and x belonging to ]0, 1]),
amorphous hydraulic phases having a molar ratio C/A comprised between 0.3 and 15,
these hydraulic binders being such that the cumulative $Al_2O_3$ contents of these phases are preferably comprised between:
3 and 70% by weight of the total hydraulic binder;
preferably between 7 and 50% by weight;
and more preferably between 20 and 30% by weight.

The hydraulic binders (a.ii) of the sulphoaluminate type, mainly forming ettringite on hydration. The sulphoaluminate clinkers are obtained from a mixture of calcium carbonate in the form of limestone, bauxite and calcium sulphate, which is either gypsum, anhydrite or hemihydrate. The main constituent at the end of the manufacturing process is Ye'elimite, C4A3$. A possible source of sulphoaluminate binder is CTS 25 Belitex (75% CSA, 25% gypsum).

According to a remarkable feature of the invention, the concentration of binder (a) in the dry composition is comprised within the following concentration ranges, expressed as a % of dry weight of the composition and given in increasing order of preference: [15-99.5]; [20-98]; [25-97]; [25-96]; [30-95].

Superabsorbent Polymer (SAP)

Preferably, the [SAP] concentration in the composition is defined as follows, as a of dry weight, in increasing order of preference:
$0.1 \leq [SAP] \leq 20$;
$0.2 \leq [SAP] \leq 15$;
$0.3 \leq [SAP] \leq 10$;
$0.4 \leq [SAP] \leq 7$;
$0.5 \leq [SAP] \leq 6$.

The SAPs are for example pulverulent polymers:
capable of swelling by means of water or aqueous salt solutions to form a hydrogel, capable of absorbing at least 30, 50, 100, 200, 300, 400 times their weight, in increasing order of preference;
crosslinkable;
having a high molecular weight;
either anionic and/or cationic;
and capable of being produced by radical polymerization of ethylenically unsaturated compounds (for example vinyl compounds) and by subsequent drying of the polymers obtained.

The hydrogels are, for example, gels containing water bound to hydrophilic polymers and crosslinked in three-dimensional networks.

Preferably, the SAP (b) is chosen from the group comprising, or even better constituted by:
- crosslinked sodium polyacrylates;
- crosslinked sodium acrylamide and acrylate copolymers;
- crosslinked sodium acrylate or acrylamide copolymers and copolymers of a compound comprising at least one group of the sulphonic and/or phosphonic type;
- hydrolyzed crosslinked starch and acrylonitrile copolymers;
- crosslinked maleic anhydride and ethylene copolymers;
- crosslinked carboxymethylcelluloses;
- crosslinked polyethylene oxide;
- and/or phosphoric acid grafted polyvinyl alcohol-based polymers;
- and mixtures thereof.

Admixtures

Advantageously, the composition according to the invention comprises, in addition to the components (a)-(b), at least one of the following components:
- (c) a setting retarder,
- (d) a setting accelerator,
- (e) a water-retaining agent,
- (f) a filler,
- (g) a lightweight filler,
- (h) a water repellent,
- (i) a colouring agent,
- (j) fibres,
- (k) an anti-foaming agent,
- (l) a re-dispersible powder resin,
- (m) a rheological agent,
- (n) an air-entraining or foaming agent,
- (o) a gas-generating agent,
- (p) a fire retardant.

The admixtures (c) to (p) serve to standardize the properties of the material and make it possible to meet the specific requirements of each application of the dry (e.g. cementitious) composition: mortar, render, adhesive, paste.

Setting Retarders (c) and Setting Accelerators (d)

The setting retarders (c) and setting accelerators (d) are water-soluble products that modify the solubilities, dissolution speeds and hydration speeds of the various constituents of the dry cementitious composition.

The setting retarder (c) is preferably chosen from the group comprising, or even better constituted by, calcium chelating agents, carboxylic acids and salts thereof, polysaccharides and derivatives thereof, phosphonates, lignosulphonates, phosphates, borates, and the salts of lead, zinc, copper, arsenic and antimony, and more particularly from tartaric acid and its salts, preferably its sodium or potassium salts, citric acid and its salts, preferably its sodium salt (trisodium citrate), sodium gluconates; sodium phosphonates; sulphates and their sodium or potassium salts, and mixtures thereof.

The setting accelerator (d) is preferably chosen from the group comprising, or even better constituted by, the alkali and alkaline earth salts of hydroxides, halides, nitrates, nitrites, carbonates, thiocyanates, sulphates, thiosulphates, perchlorates, silica, aluminium, and/or from the carboxylic and hydrocarboxylic acids and salts thereof, alkanolamines, insoluble silicate compounds such as fumed silicas, fly ash, or natural pozzolanas, aluminium ion sources, quaternary ammonium silicates, finely divided mineral compounds such as silica gels or finely divided calcium and/or magnesium carbonates and mixtures thereof; this setting accelerator being preferably chosen from the group comprising, or even better constituted by, chlorides and their sodium or calcium salts; carbonates and their sodium or lithium salts, sulphates and their sodium or potassium salts, calcium hydroxides and formates and mixtures thereof.

Water-Retaining Agent (e)

The water-retaining agent (e) has the property of retaining the mixing water before setting. The water is thus kept in the render, mortar or concrete paste, giving it very good adherence and good hydration. To a certain extent, it is less absorbed on the support, surface release is restricted and thus there is little evaporation.

The water-retaining agent (e) is preferably chosen from the group comprising, or even better constituted by, the polysaccharides and preferably the cellulose or starch ethers and mixtures thereof, and preferably from the group comprising methylcelluloses, hydroxyethylcelluloses, methylhydroxypropylcelluloses, methylhydroxyethylcelluloses and mixtures thereof, or from the guar ethers, modified or not, and mixtures thereof or the mixture of these different families.

Filler (f)

The filler (f) is preferably chosen from the group comprising, or even better constituted by: fillers and/or sands, preferably from the siliceous, calcareous, silicocalcareous, magnesium sands and mixtures thereof, the siliceous, calcareous, silicocalcareous, magnesium fillers and mixtures thereof, and/or from the metallic oxides, aluminas, and/or from glass beads and the natural and synthetic mineral silicates, preferably chosen from clays, micas, metakaolins, slags, fumed silicas, precipitated silicas, fly ash and mixtures thereof.

Lightweight Filler (g)

The lightweight filler (g) is preferably chosen from the group comprising, or even better constituted by: expanded perlite, expanded vermiculite, silica aerogels, expanded polystyrene, cenospheres (fillites), alumina hollow balls, expanded clays, pumice, glass hollow balls (3M® type) or expanded glass granules (Poraver®, Liaver®), silicate foam grains, rhyolite (Noblite®), and mixtures thereof.

Water Repellent (h)

The water repellent (h) is preferably chosen from the group comprising, or even better constituted by, fluorinated, silanized, siliconated, siloxanated agents, fatty acid metal salts and mixtures thereof, preferably from the sodium, potassium and/or magnesium salts of oleic and/or stearic acids and mixtures thereof.

Colouring Agent (i)

The colouring agent (i) is preferably chosen from the group comprising, or even better constituted by, the organic and/or mineral pigments, and more particularly from the oxides of iron, titanium, chromium, tin, nickel, cobalt, zinc, antimony, and/or from polysulphurated sodium aluminosilicates, carbon, the sulphides of cobalt, manganese, zinc, and/or from the high-transparency or highly infrared-reflective pigments and mixtures thereof.

Fibres (j)

The fibres (j) are chosen from the group comprising, or even better constituted by, mineral, animal, plant and synthetic fibres, more particularly from the group comprising, or even better constituted by, polyamide, polyacrylonitrile, polyacrylate, cellulose, polypropylene, polyvinyl alcohol, glass, metal, flax, polycarbonate, sisal, jute, hemp fibres and mixtures of these fibres.

Anti-Foaming Agent (k)

The anti-foaming agents (k) are used to increase the cohesion of the render by limiting the presence of air bubbles. They make it possible to reduce the secondary effect of other additives or as a consequence of mixing, entraining air.

The anti-foaming agent (k) is preferably chosen from the group comprising, or even better constituted by, polyether polyols, hydrocarbonated molecules, siliconated molecules, hydrophobic esters, non-ionic surfactants, polyoxiranes and mixtures thereof.

Re-Dispersible Powder Resin (l)

The re-dispersible powder resin (l) is preferably chosen from the group comprising, or even better constituted by, the families of the acrylic homo- or copolymer resins, vinyl acetate-ethylene copolymers, styrene-acrylic copolymers, vinyl acetate, vinyl versatate and maleic acid dialkyl ester terpolymers, vinyl acetate and vinyl versatate copolymers, styrene and butadiene copolymers and mixtures thereof.

Air-Entraining or Foaming Agent (m)

The air-entraining agent (m) is preferably chosen from the group comprising, or even better constituted by, ionic or non-ionic surfactants, preferably from sodium alkylsulphonates, and more particularly C14 and C16 sodium alpha-olefin sulphonates and mixtures thereof.

Rheological Agent (n)

The rheological agent (n) is preferably chosen from the group comprising, or even better constituted by, thickeners, water-reducing plasticizers (mineral and/or organic) and mixtures thereof, and more preferably from the sub-group comprising, or even better constituted by, polysaccharides and derivatives thereof, polyvinyl alcohols, mineral thickeners, linear polyacrylamides, polynaphthalene sulphonates, polymelamine sulphonates, polycarboxylates and mixtures thereof.

Gas-Generating Agent (o)

The agents (o) that generate gas in situ are chosen from the admixtures that, on contact with the compositions according to the invention, generate oxygen, hydrogen, nitrogen, carbon monoxide or dioxide, ammonia, methane. They can be chosen from the admixtures described in U.S. Pat. No. 7,288,147 and in particular from the families of azodicarbonamide, sodium bicarbonate, organic or inorganic peroxides, toluenesulphonyl hydrazide, benzenesulphonyl hydrazide, toluenesulphonyl acetone hydrazone, toluenesulphonyl semicarbazide, phenyltetrazole, sodium borohydride, dinitroso pentamethylenetetramine.

Fire Retardant (p)

The fire retardant (p) is preferably chosen from the group comprising, or even better constituted by, flame-retarding agents having chemical and/or physical action, halogenated flame-retarding agents, phosphorated flame-retarding agents, nitrogenated flame-retarding agents, intumescent systems, mineral flame-retarding agents, metal hydroxides, zinc compounds, borates, antimony oxides, nanocomposites based on aluminium silicate-based clays and mixtures thereof, preferably from the sub-group comprising, or even better constituted by, Tetrachlorobisphenol A (TBBPA), chloroparaffins, organic phosphates, red phosphorus, phosphonates, phosphinates, melamine, its salts and homologues, aluminium or magnesium hydroxides, zinc hydroxystannates, zinc borate and mixtures thereof.

The invention also relates to the combinations of components (a) to (p), capable of being supplied separately in order to reconstitute the above-mentioned dry cementitious composition at the time of use.

In particular, these can be ready-to-use mixtures comprising either a single component with all of the necessary components (a) to (p), or more than one component, for example two components comprising, on the one hand, one portion of the above-mentioned components (a) to (p) and, on the other hand, the other portion of the above-mentioned components (a) to (p). Certain portions of the above-mentioned components (a) to (p) can be incorporated into the mixing liquid (for example water), which is then presented in the form of a dispersion.

Wet Formulation

According to another aspect, the use according to the invention involves a wet formulation for the construction industry formed by a mixture of a liquid, preferably water, and the above-defined dry (e.g. cementitious) composition. This mixture is advantageously produced at a mixing ratio greater than or equal to, as a % by weight and in increasing order of preference: 20; 25; 30; 40; 45; 50; 60; 70; 80; 90; 100.

In particular, this wet formulation can be used to obtain lightweight hardened products for the construction industry, such as exterior or interior coverings or renders (e.g. exterior thermal insulation system (ETI)/decoration/protection/waterproofing), adhesives, solid objects, etc.

Hardened Products for the Construction Industry

By way of example of the hardened products to which the use according to the invention relates, there may be mentioned hereinafter:

products produced on site by hardening of the wet formulations resulting from mixing the compositions according to the invention, e.g.:
Thin-set mortars, mortar joints, resurfacing renders, smoothing renders;
Screeds, lightweight screeds for underfloor heating;
Exterior coverings of the Thick or Thin Mineral Coverings type and mineral paints;
Components of the Exterior Thermal Insulation (ETI) systems including insulation adhesive, the under layer used to fix the lath and the exterior finishing render;
Tile adhesives;
Tiling grouts;
Pointing renders;
Interior and exterior renders, for example single-layer renders;
Insulating material for the exterior or interior of buildings;
Filling mortars or concretes;
Caulking and sealing mortars, concrete repair mortars, frost-resistant mortars, concrete waterproofing systems, waterproof membranes;
Grouts, lightweight grouts for cementing oil wells;
Lightweight mortars or concretes intended to be put in place by spraying or pouring into hollow walls or into permanent formworks for producing new buildings or renovating old buildings.
products prefabricated in an industrial environment by hardening of the wet formulations resulting from mixing the compositions according to the invention, e.g.:
Lightweight prefabricated panels intended for the erection of buildings (load-bearing elements for the structure or insulation panels);
Lightweight concrete blocks intended to be used as structural, insulating or cladding elements;
Prefabricated elements, such as window sills, angle beams, mouldings, etc.

The hardened products to which the invention more specifically relates are lightweight or semi-lightweight finishing coverings which constitute a new-generation alternative to the existing coverings on the market (of the MONOREX® type) and containing lightweight fillers of the Poraver® type, vermiculite, perlite, etc. One of the essential features contributed by the mineral binder (a)/SAP (b) mixture is the provision of a finishing covering that is lighter in weight.

The dry compositions on which these coverings are based advantageously have low SAP (b) contents, preferably less than or equal to 2-3% by dry weight and mixing ratios that are preferably less than or equal to 20%-30%.

SAP (b) is an advantageous means of economically replacing for example the lightweight filler (h) while providing the following benefits:

reducing the dependence on variations in the characteristics of raw materials in the case of fillites, perlites, vermiculites, attapulgites;

reducing the $CO_2$ footprint and the cost involved in transporting very low-density raw materials;

reducing the weight and volume of the dry compositions by improving the ratio;

better reproducibility of the reduction in weight, as the amount of air in the hardened matrix depends primarily on the quantity of mixing water.

Other hardened products to which the invention more specifically relates are insulating materials that are installed in situ on site or prepared in the form of prefabricated parts in an industrial environment. One of the essential features contributed by the mineral binder (a)/SAP (b) mixture is reducing the thermal conductivity. These insulating materials in the form of renders or prefabricated parts advantageously have high SAP (b) contents, preferably greater than or equal to 2-3%, and mixing ratios preferably greater than or equal to 30%-50%, more preferably 100%.

The lambda values involved are advantageously less than or equal to those of the YTONG materials, namely for example less than or equal to 0.08 for the structural elements, for a mechanical strength of approximately 2 to 3 MPa and for example less than or equal to 0.05 for non-structural elements with mechanical strengths greater than or equal to 0.5 Mpa.

The hardened products according to the invention comprise a mineral binder (a) and at least one SuperAbsorbent Polymer (SAP) (b):

the thermal conductivity $\lambda$ ($W \cdot m^{-1} \cdot K^{-1}$) of which is less than 1.0, preferably less than or equal to 0.95 and preferably less than or equal to 0.90;

and the greater reduction in thermal conductivity $\lambda$ ($W \cdot m^{-1} \cdot K^{-1}$) of which, compared with a hardened product without SAP (b), is greater than or equal to 10%, preferably 15% and more preferably 20%.

Building or Civil Engineering Structures

The invention also relates to hardened products characterized in that they constitute all or part of a building or civil engineering structure, produced at least partly with a wet formulation involved in the use according to the invention, this formulation hardening after application and shaping, or from hardened construction products.

Methods

The invention also relates to the methods for preparing the above-mentioned dry (e.g. cementitious) composition, the above-defined wet formulation and the method for application on a building surface or for manufacturing hardened products for the construction industry, building or civil engineering structures by means of the wet formulation involved in the use according to the invention.

The method for preparing the above-defined wet formulation essentially consists of blending a liquid, preferably water, with all or some of the components of the composition involved in the use according to the invention, the remainder of the components then being incorporated gradually into the mixture if this has not been done beforehand.

These methods are easily implemented by construction workers.

In the case of mixing the water with the dry (e.g. cementitious) composition, this can be discontinuous mixing in which, in the tank of a cement gun, water is mixed with a ready-to-use mixture comprising all or some of constituents (a) to (p). The blending time is preferably equal to 1 to 30 mn, or even 3 to 10 mn. Certain components can be incorporated gradually.

Application by Spraying

Another subject of the invention is the application of the previously defined wet formulation by spraying onto a building surface, preferably onto a wall. These can be new buildings or buildings being renovated.

According to another aspect, the invention relates to a method for application on a building surface or fabrication of a civil engineering building structure by means of the wet formulation as mentioned above.

Supports

The invention also relates to the supports (concrete, render, ETI system) covered by the hardened products obtained from the wet formulation, in accordance with the use according to the invention.

I. Materials Used

I.1 Mineral Binders (a)
Portland Cement CEM I, 52.5N
Calcium Aluminates
DENKA® SC-1 from Newchem® [Al2O3 22-25%-CaO 39-45%-SO3 26-30%]
TERNAL® RG from Kerneos® [—CaO.Al2O3-2CaO.Al2O3.SiO2-12CaO.7Al2O3-2CaO.SiO2-4CaO.Al2O3.Fe2O3]
Sulphoaluminate Cement
Hydraulic binder of the sulphoaluminate type, mainly forming ettringite on hydration. The sulphoaluminate clinkers are obtained from a mixture of calcium carbonate in the form of limestone, bauxite and calcium sulphate, which is either gypsum, anhydrite or hemihydrate. The main constituent at the end of the manufacturing process is Ye'elimite, C4A3$. A possible source of sulphoaluminate binder is CTS 25 Belitex (75% CSA, 25% sulphates).
Lime
Aerated lime: Chaubat CL90 from Bonargent-Goyon.
White hydraulic lime NHL-3.5Z CE marketed by Lafarge cements, Cruas factory.
Composition: Lime 89%, CEM II/A-LL 42.5 N CE PM-CP2 NF "white: 11%
Sulphates: Prestia selecta: very finely-ground beta hemihydrate: 0.1%>160 microns.

I.2 SuperAbsorbent Polymer (b)
Aquasorb®3005S: crosslinked potassium acrylamide and acrylate copolymer from SNF® FLOERGER
Luquasorb FP800 from BASF: crosslinked sodium polyacrylate;

I.3 Accelerator Component (c)
1. SA 502 Axilat®: 100% amorphous "flash" alumina from Momentive®.
2. Fine grade lithium carbonate from RODACHEM. Li2CO3 content >99%. Density 2.049 g/cm3, average grain size 66 µm.

I.4 Retarder (d)
Fine granular anhydrous citric acid, from Gadot Biochemical Industries, water content 0.2% max, 5% maximum will not pass through a 590 micrometer sieve.

I.5 Water-Retaining Agent (e)
Cellulose ethers: METHOCEL 306 of typical viscosity 38,000 mPa·s (Brookfield rotary viscosimeter, model RV, 20 rpm, 2% in water at 20° C.).

Starch ether: Solvitose H20/60: Pregelatinized starch ether, pH 11 for a 5% solution, Brookfield Viscosity (6.8% solution in demineralized water at 25° C., n=20 min−1, no. 4 spindle): approximately 15,000 mPa·s.

I.6 Filler (f)

Sand (PE2LS) or Fulchiron PE2LS: silica sand with a maximum diameter less than or equal to 0.4 0.315 mm (Supplier: Fulchiron quarries).

I.7 Water Repellent (h)

Magnesium stearate: technical grade marketed by Peter Greven. Magnesium soap obtained from technical grade stearine.

Sodium oleate: fine powder, white to light yellow in colour, marketed by Peter Greven. Sodium soap obtained with technical oleic acid.

I.8 Colouring Agent (i)

Bayferrox Rouge 110 pigment: synthetic iron oxide α $Fe_2O_3$, 96% $Fe_2O_3$, barite binder, relative colouring power between 95 and 105%, marketed by Bayer.

I.9 Fibres (j)

Polyacrylonitrile fibres FPAC 243/125, marketed by STW SCHWARWALDER TEXTIL WERKE, specific density 1.18 g/cm3, maximum moisture content 2%, approximate length 0.8 mm.

I.10 Anti-Foaming Agent (k)

PERAMIN DEFOAM 50 PE from Kerneos. Mixture of hydrophobic esters, white powder, grain size: 99%<600 µm.

I.11 Re-Dispersible Powder Resin (l)

Re-Dispersible polymer powder (VINNAPAS® 5010N): Water-redispersible resin from WACKER. Ethylene vinyl/acetate copolymer. Solid matter 98-100%, ash: 8-13% polyvinyl alcohol protective colloid, grain size max. 4% does not pass through 400 µm, predominant grain size 0.5-8 µm, film formation temperature 4° C.

I.12 Rheological Agent (m)

Thickener: Pangel S9: sepiolite produced by TOLSA. Mineral clay belonging to the phyllosilicates family, the chemical nature of which is a hydrated magnesium silicate.

Composition: Sepiolite (asbestos free) 85%, Other clays 15%.

Plasticizer: Melment F10: superplasticizer based on polymelaminesulphonate for cement- or calcium sulphate-based mortars.

I.13 Air-Entraining Agent (n)

Hostapur OSB: sodium sulphonate in powder form marketed by Shin-Etsu, maximum water content 2%, 15 to 45% of particles <100 µm.

I.14 Fire Retardant (p)

Portaflame sg200, synthetic aluminium hydroxide marketed by SA MINERAIS DE LA MEDITERRANEE.

II. Tests

II.1 Operating Procedure for Measuring Thermal Conductivity λ with a TC Meter

1/ Operating Principle:

Its principle consists, by means of a combination of a heating element and a temperature sensor (both combined in the same probe), of measuring the temperature increase experienced by the sensor placed between 2 mortar mock-ups, over a defined heating period.

2/ Apparatus:

TC meter, comprising 2 elements:
  The control unit, acting to generate the heater power and to interpret the curve of the temperature increase induced in the material to be tested.
  The probe, acting to transmit the heater power and to take the induced temperature (thermocouple). In the present case, this is a single stem 80/A probe (80 mm in length).

Figure 1:
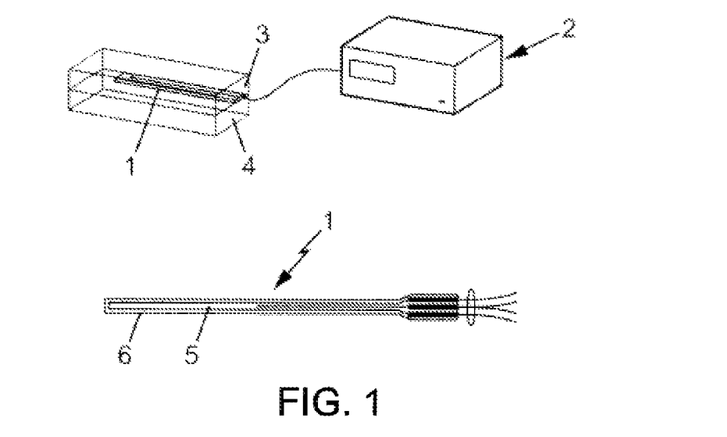
FIGS. 1-2 represent embodiments as described herein.

The attached FIG. 1 shows the schematic diagram of the measurement of thermal conductivity by the hot wire method using a TC meter. The latter comprises a probe (1) connected to a generator (2) of the power and acquisition scale interval $\Delta T=f(t)$. This probe (1), which is intended to be placed between 2 test pieces (3,4), has a length of 80 mm. It comprises a thermocouple (5) allowing the temperature of a heating element (6) to be increased.

3/ Preparation of the Test Pieces:

Form the test pieces of the product to be tested in accordance with standard NF EN 1015-11 in 4×14×16 moulds (2 test pieces, formed under the same conditions, are necessary for one measurement) and store them under the conditions specified by the standard.

As the lower face of the test piece will be in contact with the probe, it must be as smooth and flat as possible for a greater reliability of the measurement.

4/ Operating Procedure for the TC Meter:

Position and centre the probe (1) between the 2 test pieces (3,4).

Adjust the programming parameters of the probe:
  Length (value for the length of the heating element to be entered in meters): 0.08 m;
  Resistance (value for the resistance of the heating element to be entered in Ohms): the probes are supplied with an accurate indication of their resistance in Ohms;
  Power (value for the power input of the heating element to be entered in Watts): it is a function of the length of the heating element, its resistance and the value towards which the thermal conductivity measurement tends. Its parameterization can be guided by the maximum temperature variation displayed during the test, which must be comprised between 10 and 15° C.:
    If the temperature variation is <10° C.: increase the heater power;
    If the temperature variation is >15° C.: reduce the heater power.
  The single stem probe is suitable for thermal conductivity values comprised between 0 and 1.5 W/(m·K). The power is therefore generally comprised between 0 and 2 W.
  Note: The measurement causes overheating of the material to be measured, ensure that a cooling period is provided for the material between 2 measurements.
  Measurement/heating time (value to be entered in seconds): 180 s;
  Scan time (value to be entered in seconds): 2 s;
  Maximum permissible temperature variation (value to be entered in ° C.): 25° C. The purpose is to protect the probe against destructive overheating (heating and measurement is stopped in the event that this set temperature is exceeded).

Take the measurement:
  The cycle progresses automatically and, after the programmed measurement time, the display communicates the thermal conductivity (in W/(m·K)).

II.2 Operating Procedure for Determining the Flexural and Compressive Strengths

The standard used in the test for determining the flexural Rf and compressive Rc strengths is NF EN 196-1.

III. Tests and Results

Operating Procedure
Preparation of the Dry Mixes:
The raw materials in powder form are weighed independently depending on the formulation. The raw materials are then mixed in a powder mixer of the "GUEDU" type for 3 minutes.
Mixing the "Dry Mixes"
The dry mortars obtained are mixed with the water necessary in order to obtain a homogeneous paste, in a planetary mixer of the "PERRIER" type, for one minute and thirty seconds. Rf, Rc and $\lambda$ are measured as explained in II above.

Results 28j

IV.1 - example 1; composition without SAP

|  | test 0 |
|---|---|
| mixing ratio | 16.0% |
| Rf (MPa) | 2.61 |
| Rc (MPa) | 5.87 |
| $\lambda$ (W·m$^{-1}$·K$^{-1}$) | 1.013 |

IV.2 - example 2: Portland

|  | test 1 | test 2 | test 3 |
|---|---|---|---|
| CEM 52.5 Le Havre | 99.5 | 98 | 95 |
| Aquasorb 3005S | 0.5 | 2 | 5 |
| mixing ratio | 48.8% | 85.0% | 165.0% |
| Rf (MPa) | 4.39 | 3.33 | 1.50 |
| Rc (MPa) | 44.80 | 13.90 | 3.30 |
| $\lambda$ (W·m$^{-1}$·K$^{-1}$) | 0.861 | 0.667 | 0.477 |

IV.3 - Portland + source of alumina

|  | test 4 |
|---|---|
| CEM 52.5 Le Havre | 93 |
| Aquasorb 3005S | 2 |
| Denka SC1 | 5 |
| mixing ratio | 85.0% |
| Rf (MPa) | 3.50 |
| Rc (MPa) | 12.60 |
| $\lambda$ (W·m$^{-1}$·K$^{-1}$) | 0.472 |

IV.4 - CAC

|  | test 5 | test 6 | test 7 |
|---|---|---|---|
| Ternal RG | 69.65 | 68.6 | 66.5 |
| Gypsum | 29.85 | 29.4 | 28.5 |
| Aquasorb 3005S | 0.50 | 2.00 | 5.00 |
| Mixing ratio | 42.0% | 85.0% | 165.0% |
| Rf (MPa) | 5.18 | 2.34 | 1.40 |
| Rc (MPa) | 37.40 | 10.00 | 4.30 |
| $\lambda$ (W·m$^{-1}$·K$^{-1}$) | 0.747 | 0.489 | 0.257 |

IV.5 - CSA

|  | test 8 | test 9 | test 10 |
|---|---|---|---|
| CSA | 74.5 | 73 | 70 |
| Gypsum | 25 | 25 | 25 |
| Aquasorb 3005S | 0.5 | 2 | 5 |
| Mixing ratio | 47.0% | 85.0% | 167.0% |
| Rf (MPa) | 4.04 | 1.73 | 1.34 |
| Rc (MPa) | 37.90 | 11.70 | 4.30 |
| $\lambda$ (W·m$^{-1}$·K$^{-1}$) | 0.704 | 0.413 | 0.326 |

IV.6 - Portland + sands

|  | test 11 | test 12 |
|---|---|---|
| CEM 52.5 Le Havre | 12 | 12 |
| BL200 | 5.3 | 5.2 |
| PE2LS | 34.8 | 34.6 |
| TH1000 | 47.4 | 47.2 |
| Aquasorb 3005S | 0.5 | 1 |
| Mixing ratio | 34.0% | 47.5% |
| Rf (MPa) | 1.47 | 0.70 |
| Rc (MPa) | 3.3 | 1.5 |
| $\lambda$ (W·m$^{-1}$·K$^{-1}$) | 0.985 | 0.554 |

IV.7 - CAC + sands

|  | test 13 | test 14 | test 15 |
|---|---|---|---|
| Ternal RG | 8.4 | 8.4 | 21 |
| Gypsum | 3.6 | 3.6 | 9 |
| BL200 | 5.3 | 5.2 | 4.2 |
| PE2LS | 34.8 | 34.6 | 27.4 |
| TH1000 | 47.4 | 47.2 | 37.4 |
| Aquasorb 3005S | 0.5 | 1 | 1 |
| Mixing ratio | 31.0% | 44.5% | 48.0% |
| Rf (MPa) | 0.72 | 0.23 | 1.70 |
| Rc (MPa) | 2.5 | 0.7 | 5.0 |
| $\lambda$ (W·m$^{-1}$·K$^{-1}$) | 0.903 | 0.475 | 0.688 |

IV.8 - Portland + lime + sands

|  | test 16 |
|---|---|
| CEM I 52.5 N CE CP2 NF WHITE (LE TEIL) | 12 |
| WHITE LIME NHL 3.5-Z CE | 5 |
| PK2 GRANULES | 4.0 |
| BL 200 | 7.9 |
| PK14 GRANULES | 13.8 |
| SGL15/GS14/CHC15 | 10.5 |
| TH1000LS | 14.2 |
| PE2LS | 31.6 |
| Aquasorb 3005S | 1 |
| Mixing ratio | 43.0% |
| Rf (MPa) | 1.10 |
| Rc (MPa) | 2.40 |
| $\lambda$ (W·m$^{-1}$·K$^{-1}$) | 0.666 |

IV.9 - Single-layer formula with SAP

|  | test 17 |
|---|---|
| CEM I 52.5 WHITE | 34.80 |
| lime CL90 U45 | 11.13 |
| aquasorb 3005 S | 0.80 |
| CALGAR 0.5/1.5 | 52.52 |
| methocel 306 | 0.03 |
| solvitose H20/60 | 0.37 |
| Mg stearate | 0.25 |
| Na oleate | 0.10 |
| Mixing ratio | 54.0% |
| Rf (MPa) | 1.95 |
| Rc (MPa) | 6.10 |
| $\lambda$ (W·m$^{-1}$·K$^{-1}$) | 0.750 |

Figure 2:
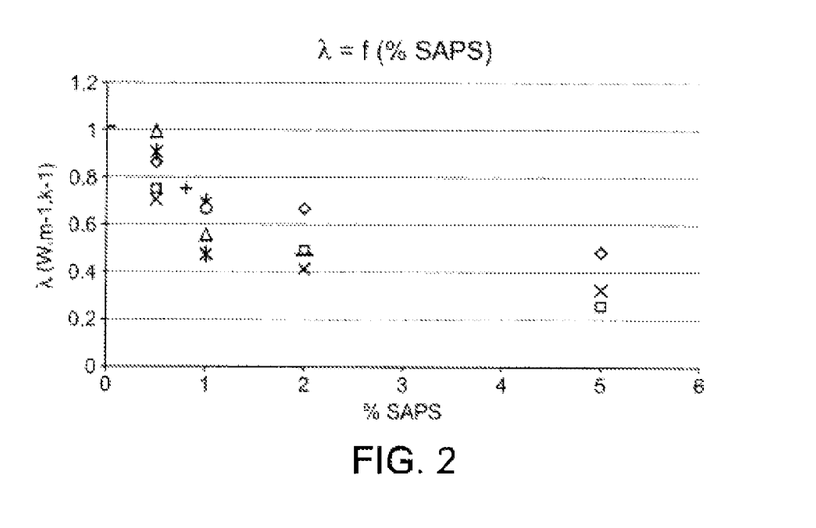

The attached FIG. 2 shows the curves $\lambda=f([SAP$ in % by weight]) for the 9 series of tests IV.1 to IV.9. The legend of these curves is given hereinafter:

- MGM single layer: formula without SAPS
◇ Portland
□ CAC
X CSA
Δ Portland+sands
* CAC+sands
○ Portland+lime+sands
+ Single-layer formula with SAPS
- Portland+source of alumina Comments: the curves of FIG. 2 show the greater reduction of $\lambda$ achieved by using mineral binder (a)/superabsorbent SAP (b) mixtures according to the invention.

The invention claimed is:

1. A method for improving thermal characteristics of a hardened product intended for the construction industry by reducing thermal conductivity λ ($W \cdot m^{-1} \cdot K^{-1}$) of said hardened product, said method comprises forming a mixture comprising (a) a mineral binder and (b) at least one SuperAbsorbent Polymer (SAP); incorporating said mixture into a dry composition or a hydraulically setting wet formulation; and forming the hardened product.

2. The method according to claim 1, wherein said thermal conductivity λ ($W \cdot m^{-1} \cdot K^{-1}$) of the hardened product is less than 1.0.

3. The method according to claim 1, wherein a reduction in thermal conductivity λ ($W \cdot m^{-1} \cdot K^{-1}$) of the hardened product, compared with a hardened product without SAP, is greater than or equal to 10%.

4. The method according to claim 1, wherein said mineral binder of said mixture is at least one mineral binder selected from the group consisting of:
  (i) mineral binders that do not contain any source(s) of aluminium ions: Portland cements and/or slag cements, geopolymer cements, natural pozzolanas, fly ash, supersulphated cements, calcium sulfate, lime, potassium silicates, sodium silicates, and/or lithium silicates;
  (ii) mineral binders that contain one or more sources of aluminium ions;
    calcium aluminate cements (CAC), calcium sulfoaluminate (CSA) cements, and/or binders having a high content of alumina-rich cementitious phases; or
    hydraulic binders comprising:
      at least one phase selected from $C_3A$, CA, $C_{12}A_7$, $C_{11}A_7CaF_2$, $C_4A_3\$$ (ye'elimite), or $C_2A_{(1-x)}F_x$ (where C→CaO; A→$Al_2O_3$; F→$F_2O_3$ and x is 0 or 1);
      amorphous hydraulic phases having a molar ratio C/A which is from 0.3 to 15,
    wherein said mineral binder has a cumulative $Al_2O_3$ content which is from 3 to 70% by weight of the total hydraulic binder.

5. The method according to claim 1, wherein the SAP concentration in the composition, as a % of dry weight, is:
  0.1≤SAP≤20;
  0.2≤SAP≤15;
  0.3≤SAP≤10;
  0.4≤SAP≤7; or
  0.5≤SAP≤6.

6. The method according to claim 1, wherein said SAP is at least one selected from the group consisting of:
  crosslinked sodium polyacrylates;
  crosslinked acrylamide and sodium acrylate copolymers;
  crosslinked sodium acrylate or acrylamide copolymers and copolymers of a compound comprising at least one group of the sulfonic and/or phosphonic type;
  hydrolyzed crosslinked starch and acrylonitrile copolymers;
  crosslinked maleic anhydride and ethylene copolymers;
  crosslinked carboxymethylcelluloses;
  crosslinked polyethylene oxide;
  phosphoric acid grafted polyvinyl alcohol-based polymers;
  and mixtures thereof.

7. The method according to claim 1, wherein said composition further comprises at least one of the following components:
  (c) a setting retarder;
  (d) a setting accelerator;
  (e) a water-retaining agent;
  (f) a filler;
  (g) a lightweight filler;
  (h) a water repellent;
  (i) a coloring agent;
  (j) fibers;
  (k) an anti-foaming agent;
  (l) a re-dispersible powder resin;
  (m) a rheological agent;
  (n) an air-entraining or foaming agent;
  (o) a gas-generating agent; or
  (p) a fire retardant.

8. The method according to claim 7, in which said dry composition has at least one of the following features:
  the setting retarder is selected from the group consisting of calcium chelating agents, carboxylic acids and salts thereof, polysaccharides and derivatives thereof, phosphonates, lignosulfonates, phosphates, borates, and salts of lead, zinc, copper, arsenic and antimony;
  the setting accelerator is selected from the group consisting of the alkali and alkaline earth salts of hydroxides, halides, nitrates, nitrites, carbonates, thiocyanates, sulphates, thiosulphates, perchlorates, silica, or aluminium; carboxylic acids and salts thereof; hydrocarboxylic acids and salts thereof; alkanolamines; insoluble silicate compounds; aluminium ion sources; quaternary ammonium silicates; finely divided mineral compounds; and mixtures thereof;
  the water-retaining agent is a polysaccharides;
  the filler is selected from the group consisting of sands, fillers different from sands, and mixtures thereof;
  the lightweight filler is selected from the group consisting of perlite, expanded vermiculite, silica aerogels, expanded polystyrene, cenospheres (fillites), alumina hollow balls, expanded clays, pumice, glass hollow balls or expanded glass granules, silicate foam grains, rhyolite, and mixtures thereof;
  the water repellent is selected from the group consisting of fluorinated agents, silanized agents, siliconate agents, siloxanated agents, fatty acid metal salts, and mixtures thereof;
  the coloring agent is selected from the group consisting of the organic pigments; mineral pigments; oxides of iron, titanium, chromium, tin, nickel, cobalt, zinc, or antimony; polysulfated sodium aluminosilicates; carbon; the sulfides of cobalt, manganese, or zinc; high-transparency pigments; highly infrared-reflective pigments; and mixtures thereof;
  the fibers are selected from the group consisting of mineral fibers, animal fibers, plant fibers synthetic fibers, polyamide, polyacrylonitrile, polyacrylate, cellulose, polypropylene, polyvinyl alcohol, glass, metal, flax, polycarbonate, sisal, jute, hemp fibres, and mixtures of these fibres; the anti-foaming agent is selected from the group consisting of polyether polyols, hydrocarbonated molecules, siliconate molecules, hydrophobic esters, non-ionic surfactants, polyoxiranes, and mixtures thereof;
  the re-dispersible powder resin selected from the group consisting of families of acrylic homo- or copolymer resins, vinyl acetate-ethylene copolymers, styrene-acrylic copolymers, vinyl acetate, vinyl versatate and maleic acid dialkyl ester terpolymers, vinyl acetate and vinyl versatate copolymers, styrene and butadiene copolymers, and mixtures thereof;
  the rheological agent is selected from the group consisting of thickeners, water-reducing plasticizers, and mixtures thereof;

the air-entraining agent is selected from the group consisting of ionic surfactants or non-ionic surfactants;

the agent that generates gas in situ is selected from the group consisting of admixtures that, on contact with the compositions according to the invention, generate oxygen, hydrogen, nitrogen, carbon monoxide or dioxide, ammonia, or methane;

the fire retardant is selected from the group consisting of flame-retarding agents having chemical and/or physical action, halogenated flame-retarding agents, phosphorated flame-retarding agents, nitrogenated flame-retarding agents, intumescent systems, mineral flame-retarding agents, metal hydroxides, zinc compounds, borates, antimony oxides, nanocomposites based on aluminium silicate-based clays, and mixtures thereof:

optionally from the sub-group consisting of Tetrachlorobisphenol A (TBBPA), chloroparaffins, organic phosphates, red phosphorus, phosphonates, phosphinates, melamine, its salts and homologues, aluminium or magnesium hydroxides, zinc hydroxystannates, zinc borate, and mixtures thereof.

9. The method according to claim 1, wherein said wet formulation has a mixing ratio of the dry composition with water, greater than or equal to, as a % by weight of at least one of the following 20; 25; 30; 40; 45; 50.

10. The method according to claim 1, wherein said thermal conductivity $\lambda$ ($W \cdot m^{-1} \cdot K^{-1}$) of the hardened product is less than or equal to 0.95.

11. The method according to claim 1, wherein a reduction in thermal conductivity $\lambda$ ($W \cdot m^{-1} \cdot K^{-1}$) of the hardened product, compared with a hardened product without SAP, is greater than or equal to 15%.

12. The method of claim 4, wherein said hydraulic binder is such that a cumulative $Al_2O_3$ content thereof is from 3 to 70% by weight of the total hydraulic binder.

13. The method of claim 4, wherein said hydraulic binder is such that a cumulative $Al_2O_3$ content thereof is from 7 to 50% by weight.

14. The method of claim 8, in which said dry composition has at least one of the following features:

the setting retarder is selected from the group consisting from tartaric acid and its salts, citric acid and salts thereof, sodium gluconates, sodium phosphonates, sulphates, and mixtures thereof;

the setting accelerator is selected from the group consisting of fumed silicas; fly ash; natural pozzolanas; silica gels; finely divided calcium and/or magnesium carbonates chlorides and their sodium or calcium salts; carbonates and sodium or lithium salts thereof; sulfates and their sodium or potassium salts; calcium hydroxides and formats; and mixtures thereof;

the water-retaining agent is selected from the group consisting of cellulose ethers, starch ethers, and mixtures thereof;

the filler is selected from the group consisting siliceous sands, calcareous sands, silicocalcareous sands, magnesium sands, siliceous fillers, calcareous fillers, silicocalcareous fillers, magnesium fillers, metallic oxides, aluminas, glass beads natural mineral silicates, synthetic-mineral silicates, and mixtures thereof;

the water repellent is selected from the group consisting the sodium, potassium and/or magnesium salts of oleic acids, sodium, potassium and/or magnesium salts of stearic acids, and mixtures thereof;

the rheological agent is selected from the group consisting of polysaccharides and derivatives thereof, polyvinyl alcohols, mineral thickeners, linear polyacrylamides, polynaphthalene sulfonates, polymelamine sulfonates, polycarboxylates, and mixtures thereof; and the air-entraining agent is selected from the group consisting of sodium alkylsulfonates, C14 and C16 sodium alpha-olefin sulfonates, and mixtures thereof.

\* \* \* \* \*